United States Patent
Guenthner et al.

(10) Patent No.: US 7,548,812 B2
(45) Date of Patent: Jun. 16, 2009

(54) METHOD AND DEVICE FOR CONTROLLING THE SPEED OF A VEHICLE

(75) Inventors: Jens Guenthner, Besigheim (DE); Hans Schulte, Ludwigsburg (DE); Boris Knobloch, Markgroeningen (DE); Mario Kustosch, Markgroeningen (DE); Christian Muehlbauer, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 672 days.

(21) Appl. No.: 10/491,998

(22) PCT Filed: Sep. 6, 2002

(86) PCT No.: PCT/DE02/03313

§ 371 (c)(1),
(2), (4) Date: Sep. 14, 2004

(87) PCT Pub. No.: WO03/033289

PCT Pub. Date: Apr. 24, 2003

(65) Prior Publication Data

US 2005/0021211 A1    Jan. 27, 2005

(30) Foreign Application Priority Data

Oct. 11, 2001    (DE) ................. 101 50 421

(51) Int. Cl.
*B60T 8/32* (2006.01)
*F02D 41/00* (2006.01)
*F02D 31/00* (2006.01)

(52) U.S. Cl. .................. 701/93; 123/350; 123/351; 123/363; 123/170

(58) Field of Classification Search .............. 701/94
See application file for complete search history.

(56) References Cited

U.S. PATENT DOCUMENTS

| 4,337,511 | A | | 6/1982 | Schneider et al. |
| 4,374,422 | A | * | 2/1983 | O'Keefe et al. ............... 701/93 |
| 4,598,370 | A | * | 7/1986 | Nakajima et al. ............. 701/93 |
| 4,725,969 | A | * | 2/1988 | Onogi et al. ................. 700/304 |
| 4,747,051 | A | | 5/1988 | Hall et al. |
| 4,835,696 | A | | 5/1989 | Suzuki et al. |
| 4,860,210 | A | * | 8/1989 | McCombie ................... 701/93 |
| 4,884,203 | A | | 11/1989 | Preis et al. |
| 4,893,243 | A | * | 1/1990 | Tada et al. .................... 701/94 |
| 4,905,153 | A | * | 2/1990 | Suzuki et al. ................ 701/93 |
| 4,958,288 | A | * | 9/1990 | Takahashi .................... 701/98 |
| 5,048,631 | A | * | 9/1991 | Etoh .......................... 180/179 |
| 5,392,215 | A | * | 2/1995 | Morita ........................ 701/94 |
| 5,663,880 | A | * | 9/1997 | Saur et al. .................... 701/93 |

(Continued)

FOREIGN PATENT DOCUMENTS

DE    28 42 023    4/1980

(Continued)

*Primary Examiner*—Khoi Tran
*Assistant Examiner*—Nicholas Kiswanto
(74) *Attorney, Agent, or Firm*—Kenyon & Kenyon LLP

(57) ABSTRACT

A method and a device for controlling the speed of a vehicle are described. In the transition from a dynamic to a steady-state operating state, the initially accepted setpoint value is corrected using a correcting value which depends on the system deviation prevailing at the time when the longitudinal acceleration of the vehicle has reached, exceeded, or fallen below a predetermined threshold value.

18 Claims, 4 Drawing Sheets

FIG. 3

U.S. PATENT DOCUMENTS

| | | |
|---|---|---|
| 5,749,063 A | 5/1998 | Sakonjyu et al. |
| 5,774,820 A * | 6/1998 | Linden et al. ............. 701/93 |
| 5,854,989 A * | 12/1998 | Speck et al. ............. 701/93 |
| 5,992,551 A * | 11/1999 | Frey et al. ............. 180/179 |
| 6,202,021 B1 * | 3/2001 | Kresse et al. ............. 701/93 |
| 6,317,678 B1 * | 11/2001 | Linden ............. 701/94 |
| 7,214,110 B1 * | 5/2007 | Ehlers et al. ............. 440/1 |

FOREIGN PATENT DOCUMENTS

| | | |
|---|---|---|
| DE | 37 03 645 | 8/1988 |
| DE | 198 06 116 | 8/1999 |
| EP | 0 290 725 | 11/1988 |
| EP | 1 057 680 | 12/2000 |

* cited by examiner

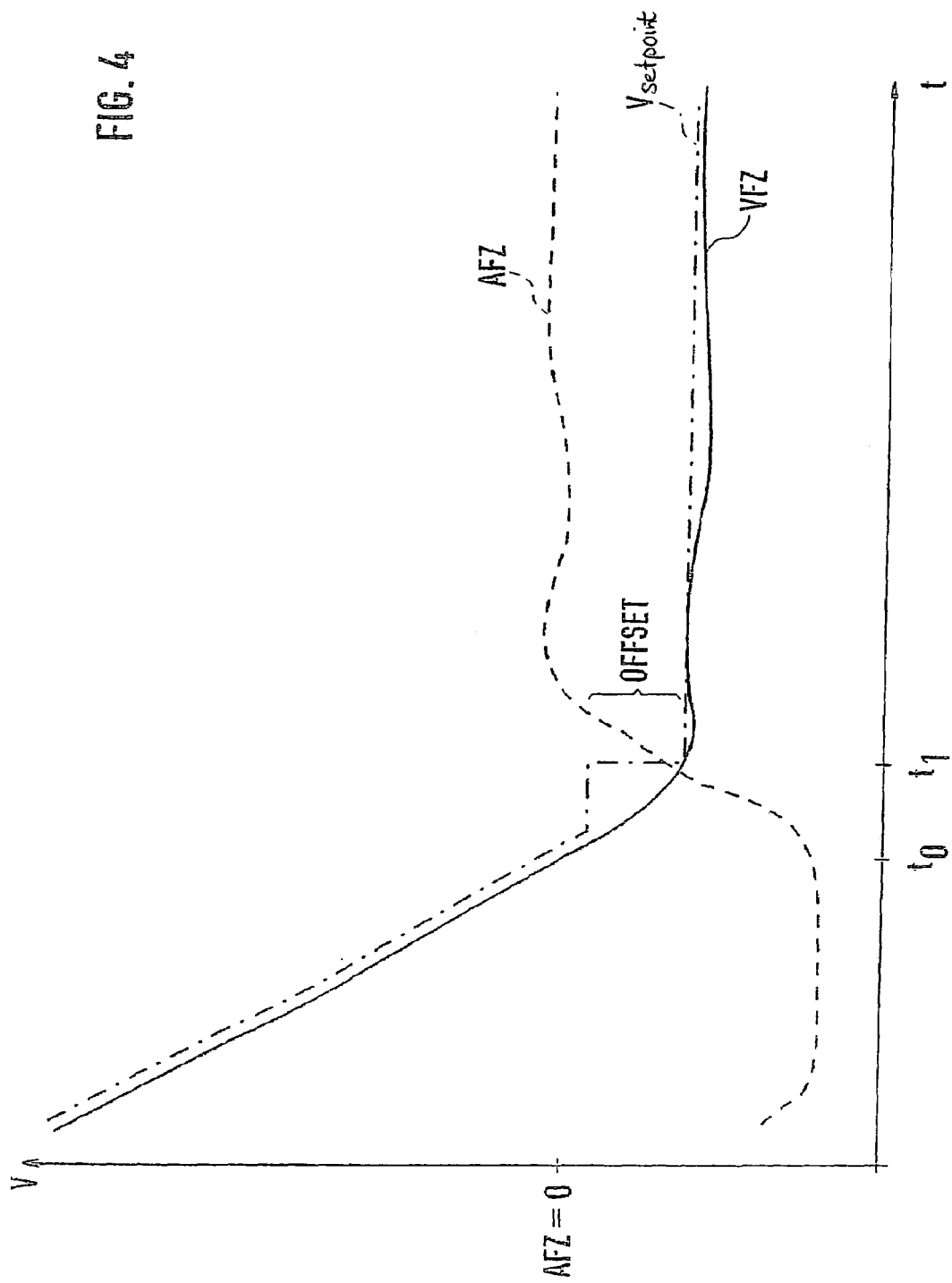

METHOD AND DEVICE FOR CONTROLLING THE SPEED OF A VEHICLE

FIELD OF THE INVENTION

The present invention relates to a method and a device for controlling the speed of a vehicle.

BACKGROUND INFORMATION

A vehicle speed controller is known from German Published Patent Document No. 28 42 023 (U.S. Pat. No. 4,337,511), in which the driving speed of the vehicle is adjusted as a function of a driving speed setpoint value predetermined by the driver. The output signal of the vehicle speed controller acts on a power controller for the vehicle engine. Depending on the design, the vehicle speed controller itself exhibits proportional, integral, and/or differential response. To improve the dynamic response of the controller in a control process which causes a change in driving speed, such as an actuation of the acceleration key, the setpoint value of the vehicle speed control is set to the value of the actual speed measured upon actuation of the key plus a fixed offset value, and change of the vehicle speed is implemented by ramp-shaped changing of the setpoint value. When the speed intended by the driver is reached, the offset value is canceled and the control is then performed based on the setpoint value present at that time.

The above-described procedure improves the dynamic response of the vehicle speed controller for a control process which increases the vehicle speed (acceleration, resumption of speed). For vehicle speed controllers, however, considerable attention must be paid to the comfortable and accurate settling of the vehicle speed at the setpoint value after such a dynamic control process has concluded.

In this connection, German Published Patent Document No. 37 03 645 (U.S. Pat. No. 4,884,203) describes the approach that when the dynamic process (an acceleration process, for example) is completed, an actuating signal is offset by a predetermined amount, and this actuating signal is then reduced according to a time curve until the acceleration of the vehicle is zero. The jump-like response of the actuating signal results, at least in many cases, in reduced comfort. Furthermore, this approach has disadvantages in its application complexity.

SUMMARY OF THE INVENTION

In accordance with the present invention, by changing the driving speed setpoint value for the transition from an acceleration or deceleration process to constant speed as a function of the existing system deviation, a comfortable transition may be provided without severe changes in torque or fluctuations in the vehicle speed.

Thus, the control quality of the controller may be improved over the entire range of use, since in the transition from a dynamic phase to a stationary phase the tendency for the vehicle speed to fluctuate may be greatly reduced.

Furthermore, the correction of the setpoint value as a function of the existing system deviation is easy to apply and does not require complex data collection for characteristic curves. The application time and thus also the application costs may be significantly reduced as a result.

The control quality or the comfortable transition response may be independent of the particular driving situation, for example, independent of whether the vehicle is traveling on a level or inclined roadway.

BRIEF DESCRIPTION OF THE DRAWINGS

FIG. 4 shows another time-dependency diagram showing the response to essential signals in the transition from a deceleration phase to constant speed, according to an exemplary procedure for correcting the setpoint speed according to the present invention.

DETAILED DESCRIPTION

Figure 1:
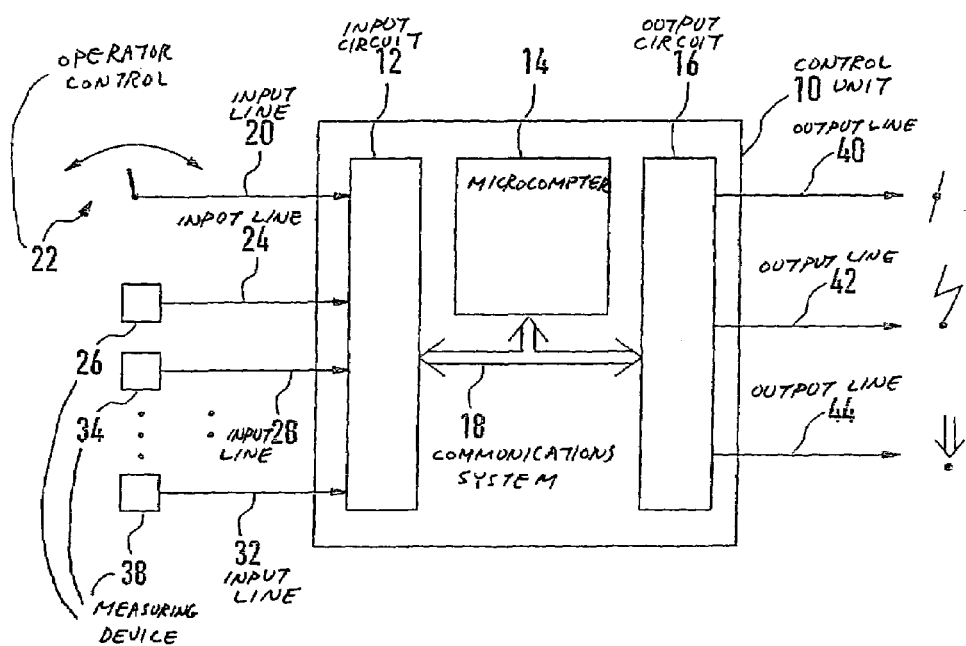
FIG. 1 shows a block diagram of a control device for controlling the driving speed of a vehicle.

FIG. 1 illustrates a control unit 10 composed essentially of an input circuit 12, microcomputer 14, and output circuit 16. These elements are connected to one another for data exchange via a communications system 18. According to an example embodiment, control unit 10 represents a control unit which controls the drive power of a drive motor of a vehicle. In many applications a vehicle speed controller is also included within the scope of such a control unit. The following description focuses on the portion of control unit 10 which is directly connected to the vehicle speed controller, whereas the other functions which are a part of control unit 10 are not described in detail.

Input circuit 12 of control unit 10 is supplied with a first input line 20 which connects control unit 10 to an operator control 22, actuatable by the driver, with which the driver may specify the functional mode of the vehicle speed controller or set the setpoint speed. An input line 24 is also provided which connects control unit 10 to a measuring device 26 for determining the vehicle speed. In another embodiment, instead of the driving speed signal, control unit 10 may be supplied with one or more wheel speed signals from which microcomputer 14 may determine the vehicle speed using a program executed therein. Input lines 28 through 32 are also provided, which connect control unit 10 to measuring devices 34 through 38 for determining additional operating variables of the engine and/or vehicle. Such operating variables include, for example, engine rotational speed, engine temperature, accelerator pedal position, etc., which are evaluated within the scope of other functional programs for controlling the drive motor.

Control unit 10 influences the power of the drive motor, and thus the speed of the vehicle, via output lines connected to output circuit 16. In an exemplary embodiment, the drive motor may be an internal combustion engine, configured so that, for example, the air supply is influenced via a first output line 40, the ignition angle is influenced via output lines 42, and the fuel metering is influenced by output lines 44.

The procedure described below for vehicle speed control may be used not only in conjunction with internal combustion engines, but also with alternative drive designs, for example, electric motors, in the same manner.

Operator control 22 may provide the driver with a choice of different conventional operating modes, such as acceleration, deceleration, resumption of speed, setting speed, etc. The appropriate selection may be sent to control unit 10 by a signal via line 20. There, the acceleration, deceleration, and/or resumption of speed processes are carried out, for example, by the ramp control of the driving speed setpoint value provided in a conventional manner. Depending on the system arrangement, the controller may include a proportional part and/or an integral part and/or a differential part. When the acceleration operating phase has concluded, i.e., when the corresponding operator control position is discontinued by the driver, the instantaneous speed present at that time may then be accepted as the setpoint speed. The vehicle speed may then go beyond this driving speed setpoint value. The acceleration of the vehicle, however, may be reduced by the commencing control intervention which reduces the vehicle speed, whereby even a negative acceleration of the vehicle may commence. To improve the transient response, the setpoint speed of the vehicle speed controller may be corrected when the instantaneous acceleration falls below a predetermined threshold value. The correcting value depends on the instantaneous deviation of the setpoint speed from the actual speed. In an example embodiment, an offset value may be formed, based on the instantaneous system deviation, which is added to the existing setpoint speed. According to an example embodiment, the correcting value may be limited to a maximum value. Furthermore, according to another example embodiment, the acceleration threshold value may depend on the longitudinal acceleration of the vehicle, for example, on a value that was present when the acceleration phase ended. According to another example embodiment, the acceleration threshold value may be formed from this acceleration value multiplied by an applicable factor, for example 0.5.

An analogous procedure may be followed for the transition from deceleration processes to constant speed. After the driver releases the deceleration key, the existing value of the driving speed may be specified as the setpoint value. If the (negative) actual acceleration of the vehicle exceeds a threshold value, this setpoint speed value may be corrected. It is also provided here that the instantaneous system deviation is to be accepted as the correcting value, which here may be limited to a maximum value. In an example embodiment, the setpoint speed may be reduced by the instantaneous system deviation. In this manner, a comfortable transition may be made from the dynamic operating phase to constant speed. Analogously, according to another example embodiment, the acceleration threshold value may be specified depending on the acceleration, for example, at the end of the deceleration process.

Figure 2:
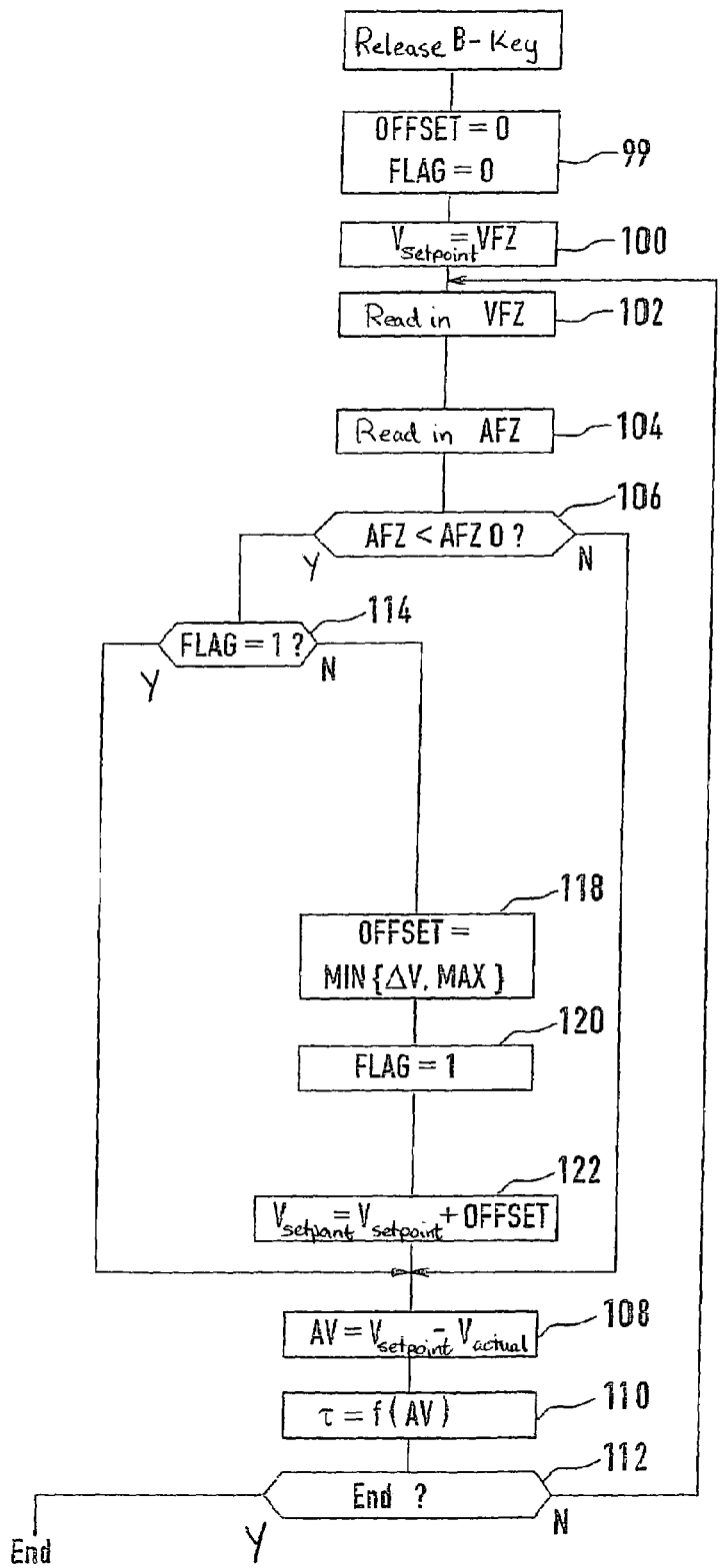
FIG. 2 shows a flowchart of an exemplary embodiment for providing the transition from an acceleration phase to constant speed.

In an example embodiment, the described procedure may be carried out using a computer program executed in microcomputer 14 of control unit 10. One example embodiment of such a computer program is illustrated in FIG. 2, using a flow diagram. The transition from the acceleration state to constant speed is illustrated. The transition from the deceleration phase to constant speed may be implemented similarly.

The program illustrated in FIG. 2 may be initiated by the driver by releasing the acceleration key (B key). Then, in step 99 an offset value OFFSET and a flag FLAG are set to zero. In step 100 the value of setpoint speed $V_{setpoint}$ is then set to instantaneous vehicle speed value VFZ. Vehicle speed VFZ is then read in step 102. Following step 102, vehicle acceleration AFZ is read in step 104. Depending on the embodiment, this may be measured or may be deduced from the change in the vehicle speed. Then in step 106 a check is made as to whether instantaneous vehicle acceleration AFZ falls below a predetermined limit value AFZ0. The limit value may either be specified as a fixed value or calculated; for example, the stored longitudinal acceleration of the vehicle when the acceleration phase ends may be decreased by a predetermined factor. If the acceleration is not below this limit value, in step 108 system deviation ΔV is generated as the deviation between the setpoint and the actual driving speed. In subsequent step 110, output signal τ from the vehicle speed controller is calculated according to the implemented controller strategy as a function of system deviation ΔV. According to the example embodiment, the output signal from the vehicle speed controller may be a desired torque for a torque on the drive unit or at the output of the drive train, which may be established by corresponding control of the drive motor and/or a transmission. Then in step 112 a check may be made as to whether the operating range for constant speed has ended, for example, by a new actuation of the acceleration key, by switching off the vehicle speed controller, by actuation of the deceleration key, etc. If this is not the case, the program is repeated starting with step 102.

Some steps of the approach described thus far may correspond to a conventional vehicle speed control, with the exception of the comparison beginning at step 106.

To improve the transition, special measures are provided when the vehicle acceleration falls below the limit value checked in 106. If this is the case, and it is determined in step 114 that a flag FLAG does not have the value 1, system deviation ΔV corresponding to the system deviation determined in step 108 may be used to form a correcting value. In step 118 an offset value OFFSET is formed as the smaller of the values of system deviation ΔV and a predetermined maximum value MAX. This maximum value is applicable and represents the upper limit of the setpoint correction following acceleration. According to an example embodiment, the maximum value may be 5 km/h. According to another example embodiment, the maximum value may depend on the operating variable, for example the engine rotational speed, vehicle speed, engine load, etc.

According to an example embodiment, the correcting value may be deduced from the instantaneous system deviation, for example, by correction with an optional factor dependent on the operating variable (engine speed, engine load, type of driver, etc.).

Following step 118, in step 120 flag FLAG is set to 1. In subsequent step 122, setpoint speed $V_{setpoint}$ is corrected, taking into account the offset value calculated in step 118. According to an example embodiment, the offset value may be added to the instantaneous vehicle speed setpoint value.

Following step 122 the control is carried out in steps 108 through 110 according to the correction of the setpoint speed performed in step 122. The flag set in step 120 is checked in step 114. If the flag has the value 0, presence of the acceleration condition is detected as for the first time in step 106. In this case the setpoint correction is performed. Since the setpoint correction may remain over the entire stationary operating range which follows, after the one-off correction the flag is set to 1, so that in the event of a "yes" answer in step 114, control steps 108 through 110 follow without a new correction of the setpoint speed value being made. If it is determined in step 112 that the stationary operating state has ended, in step 124 offset value OFFSET and flag FLAG are set to 0 and the program is ended until the next time the acceleration key is released.

A corresponding procedure is provided for the transition from the deceleration state to the stationary operating state, with a corresponding program being executed when the deceleration key is released. It should be noted that the acceleration comparison may be carried out in such a way that the (negative) instantaneous acceleration of the vehicle must exceed a predetermined (negative) threshold value in order for a correction of the setpoint value to result. In this correction, the setpoint speed may be reduced by a specified, system deviation-dependent factor. In an example embodiment, this is carried out by subtraction, corresponding to step 122, of the offset value from the setpoint vehicle speed stored in the transition point.

Figure 3:
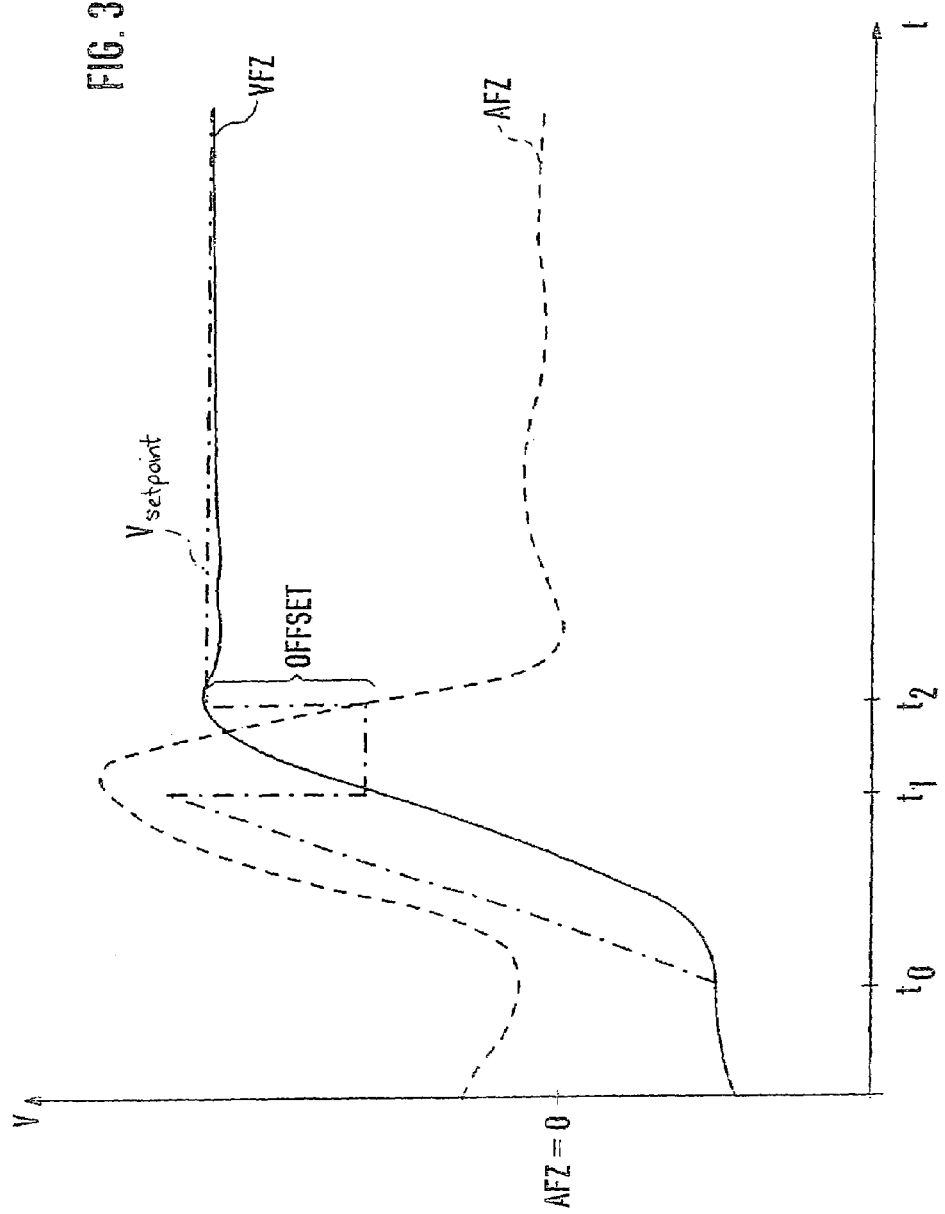
FIG. 3 shows a time-dependency diagram showing the response to essential signals in the transition from an acceleration phase to constant speed, according to an exemplary procedure for correcting the setpoint speed according to the present invention.

FIG. 3 shows the time-dependent progression of vehicle acceleration AFZ, vehicle speed VFZ, and target speed $V_{set\text{-}point}$, using the above-described procedure in an example case. At time T0 the driver actuates the acceleration key. The setpoint value (dashed-dotted line) is increased according to a predetermined time ramp. This results in a corresponding increase in the acceleration and the vehicle speed until at time T1 the driver releases the acceleration key. This causes the setpoint value to be reduced to the instantaneous speed value present at that time, resulting in a control intervention which reduces the speed and acceleration. At time T2 the acceleration falls below the predetermined threshold value, so that the setpoint value is then set to a value formed from the system deviation present at that time. Provided that it does not exceed a maximum value, the offset value may be the deviation of the actual speed value from the setpoint speed value indicated in FIG. 3. In this manner a comfortable, satisfactory transition response may be achieved without severe jumps in torque or fluctuations in speed.

FIG. 4 shows the corresponding vehicle response associated with a deceleration process. The driver has pressed the deceleration key, thereby reducing the speed according to the time ramp specified by the setpoint speed. The vehicle acceleration is negative. At time T0 the deceleration key is released, so that the actual speed at that time is accepted as the new setpoint speed. This results in a new control intervention which retards the further reduction of vehicle speed as a result of the negative system deviation. There is an associated increase in the vehicle acceleration, which in the example shown exceeds the predetermined threshold value at time T1. In this case the offset value, which is formed from the system deviation prevailing at that time, is subtracted from the existing setpoint value. Starting at time T1, the new setpoint value is effective for the subsequent constant speed phase. Thus, in the shown example, the vehicle speed actual value comfortably and accurately settles in for the transition from the deceleration state to the steady state.

The corresponding procedure may also be used in conjunction with a vehicle speed limiter, in which a control on the limit value is performed in the range of the limiting speed.

What is claimed is:

1. A method for controlling a drive motor of a vehicle having a vehicle speed controller, the method comprising:
controlling a drive motor of the vehicle as a function of a control deviation between a setpoint value for the vehicle speed and an actual vehicle speed; and
modifying the setpoint value for the vehicle speed using a modifying value that depends on the control deviation prevailing at a time when an acceleration of the vehicle, for a transition from an acceleration operating state of the vehicle speed controller to a steady-state operating state, has a negative slope and reached or dropped below a predefined threshold value, or when an acceleration of the vehicle, for a transition from a deceleration operating state of the vehicle speed controller to said steady-state operating state, has a positive slope and reached or exceeded a predefined threshold value.

2. The method according to claim 1, wherein the dynamic operating state is one of an acceleration phase and a deceleration phase.

3. The method according to claim 2, wherein the vehicle speed present at the transition from the dynamic operating state to the steady-state operating state is specified as the setpoint value, and wherein the setpoint value is modified using the modifying value.

4. The method according to claim 3, wherein the transition from the dynamic operating state to the steady-state operating state is achieved by a driver performing one of (i) releasing a corresponding control key for the dynamic operating state and (ii) discontinuing a corresponding position of an operator control for the dynamic operating state.

5. The method according to claim 3, wherein the modifying value is an offset value that is added to the setpoint value for an acceleration phase, and wherein the modifying value is an offset value that is subtracted from the setpoint value for a deceleration phase.

6. The method according to claim 5, wherein the modifying value is limited to a maximum value.

7. The method according to claim 5, wherein the threshold value for the vehicle acceleration is determined from an acceleration value that was present in the transition from the dynamic operating state to the steady-state operating state.

8. A device for controlling the speed of a vehicle, comprising:
an arrangement configured to specify a setpoint value for a vehicle speed;
an arrangement configured to determine an actual vehicle speed;
a detector configured to detect a longitudinal acceleration of the vehicle;
an arrangement configured to control a drive motor of the vehicle as a function of a control deviation between the setpoint value for the vehicle speed and the actual vehicle speed; and
an arrangement configured to modify, in a transition from a dynamic operating state to a steady-state operating state, the setpoint value for the vehicle speed using a modifying value that depends on the control deviation prevailing at a time when an acceleration of the vehicle, for a transition from an acceleration operating state to said steady-state operating state, has a negative slope and reached or dropped below a predefined threshold value, or when an acceleration of the vehicle, for a transition from a deceleration operating state to said steady-state operating state, has a positive slope and reached or exceeded a predefined threshold value.

9. The device according to claim 8, wherein the dynamic operating state is one of an acceleration phase and a deceleration phase.

10. The device according to claim 9, wherein the vehicle speed present at the transition from the dynamic operating state to the steady-state operating state is specified as the setpoint value, and wherein the setpoint value is modified using the modifying value.

11. The device according to claim 10, wherein the transition from the dynamic operating state to the steady-state operating state is achieved by a driver performing one of (i) releasing a corresponding control key for the dynamic operating state and (ii) discontinuing a corresponding position of an operator control for the dynamic operating state.

12. The device according to claim 10, wherein the modifying value is an offset value that is added to the setpoint value for an acceleration phase, and wherein the modifying value is an offset value that is subtracted from the setpoint value for a deceleration phase.

13. The device according to claim 12, wherein the modifying value is limited to a maximum value.

14. The device according to claim 12, wherein the threshold value for the vehicle acceleration is determined from an acceleration value that was present in the transition from the dynamic operating state to the steady-state operating state.

15. The device according to claim 8, wherein the dynamic operating state is one of an acceleration phase and a deceleration phase, wherein the vehicle speed present at the transition from the dynamic operating state to the steady-state operating state is specified as the setpoint value, and wherein the setpoint value is modified using the modifying value, and wherein the transition from the dynamic operating state to the steady-state operating state is achieved by a driver performing one of (i) releasing a corresponding control key for the dynamic operating state and (ii) discontinuing a corresponding position of an operator control for the dynamic operating state.

16. The device according to claim 15, wherein the modifying value is an offset value that is added to the setpoint value for an acceleration phase, and wherein the modifying value is an offset value that is subtracted from the setpoint value for a deceleration phase, wherein the modifying value is limited to a maximum value, and wherein the threshold value for the vehicle acceleration is determined from an acceleration value that was present in the transition from the dynamic operating state to the steady-state operating state.

17. The method according to claim 1, wherein the dynamic operating state is one of an acceleration phase and a deceleration phase, wherein the vehicle speed present at the transition from the dynamic operating state to the steady-state operating state is specified as the setpoint value, and wherein the setpoint value is modified using the modifying value, and wherein the transition from the dynamic operating state to the steady-state operating state is achieved by a driver performing one of (i) releasing a corresponding control key for the dynamic operating state and (ii) discontinuing a corresponding position of an operator control for the dynamic operating state.

18. The method according to claim 17, wherein the modifying value is an offset value that is added to the setpoint value for an acceleration phase, and wherein the modifying value is an offset value that is subtracted from the setpoint value for a deceleration phase, wherein the modifying value is limited to a maximum value, and wherein the threshold value for the vehicle acceleration is determined from an acceleration value that was present in the transition from the dynamic operating state to the steady-state operating state.

* * * * *